(12) United States Patent
Hauduc et al.

(10) Patent No.: US 6,904,401 B1
(45) Date of Patent: Jun. 7, 2005

(54) SYSTEM AND METHOD FOR PROVIDING REGIONAL SETTINGS FOR SERVER-BASED APPLICATIONS

(75) Inventors: Ludovic Hauduc, Kirkland, WA (US); Tuna Ertemalp, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 09/704,074

(22) Filed: Nov. 1, 2000

(51) Int. Cl.[7] .............................................. G10L 15/00
(52) U.S. Cl. ......................................... 704/8; 709/201
(58) Field of Search .............................. 704/8; 709/201, 709/222

(56) References Cited

U.S. PATENT DOCUMENTS 6,189,045 B1 * 2/2001 O'Shea et al. .............. 709/246
6,446,036 B1 * 9/2002 Bourbonnais et al. ......... 704/3
6,708,189 B1 * 3/2004 Fitzsimons et al. ......... 707/205

* cited by examiner

*Primary Examiner*—Daniel Abebe
(74) *Attorney, Agent, or Firm*—Perkins Coie LLP

(57) ABSTRACT

Using a server in a distributed computer network to provide an application to a client in the client's preferred language with the correct regional settings. A client accesses an application on a server and provides a preferred language and corresponding regional settings for the application. A local string software module determines the client's preferred language and selects a matching language pack software module. The language pack software module on the server takes the encoded content of the application and converts it into the language desired by the client. A text converter can take data such as dates, times, counting numbers, and currency values and convert them to the correct regional settings for the chosen language. The server then sends the translated application to the client. This approach eliminates the need to create separate applications for each language with distinct regional settings.

20 Claims, 8 Drawing Sheets

Overview of Language Localization Process with Regional Settings

SYSTEM AND METHOD FOR PROVIDING REGIONAL SETTINGS FOR SERVER-BASED APPLICATIONS

TECHNICAL FIELD

The present invention is generally directed to providing application content in a distributed computing environment in a variety of different languages. More specifically, the present invention supports a server-based conversion of content of an application sensitive to regional settings, such as numbers, dates, times and currency values, into the format corresponding to a desired language. The conversion is accomplished without altering the code for the application and without reproducing separate versions of the application in desired languages with distinct regional settings.

BACKGROUND OF THE INVENTION

The Internet has quickly become a popular means for transmitting information because of the world-wide access it provides to information resources. The information on the Internet is available in a variety of formats and it can have educational, entertainment, or business purposes. The World Wide Web (the "Web") is one of the largest and most popular distributed computing networks that make-up the Internet. The Web comprises interconnected computers from around the world. A computer connected to the Internet can download digital information from Web server computers. The Web comprises resources and clients that communicate digital information and instructions typically using a format known as Hypertext Markup Language (HTML). These instructions can include information for formatting text, linking to digital data, and receiving digital data.

One of the assets of the Web, world-wide interconnectivity, can also be an obstacle in that people around the world speak different languages. The information generated by Web server computers is typically in one language. A further problem is that languages often have distinct formats (regional settings) for information pertaining to dates, times, currencies, and counting numbers. For example, the date Oct. 23, 2000 is expressed in the United States as Oct. 23, 2000, but in Europe is generally expressed as Oct. 23, 2000. These constraints limit the usefulness and value of the Web server computer on a global scale.

The conventional approach to solving this problem is to design a single Web page in one language with its regional settings that permits a client to choose a language from a limited list of languages supported by the site. Copies of the Web applications are reproduced in the languages supported by the site. The regional settings for each copy are also modified to correspond to the language of that copy. Once the client makes a language selection, it is directed to one set of the Web applications in the chosen language.

The conventional approach is a labor-intensive solution in that a separate set of Web pages or Web applications must be created in each language with the correct regional settings. Any time the Web application is changed or updated, each version of the Web application must be changed to make the language and regional settings current. Maintaining a separate version of the Web application for each language and its regional settings is time consuming and limits the practical ability to support many different languages.

In view of the foregoing, there is a need in the art for a method and system which will allow Web applications to support many different languages and their regional settings. Specifically, there is a need for Web applications to provide content in various languages without separate versions of the application for each language. There is a further need to change Web applications and keep them current without having to alter the same element in each version of a Web application.

SUMMARY OF THE INVENTION

The present invention is generally directed to software modules operating in a distributed computing environment. Specifically, the invention is designed to operate on a wide area network such as the World Wide Web (the "Web"). The Web comprises Web pages or Web applications that reside on computer servers in a network and that can be accessed by clients. The invention can convert the contents of a Web application so that the format for region-specific information, such as dates, times, counting numbers, and currency values, conforms to that of the client's particular language. The invention enables the changing of formats of the elements that make-up the content of the application without altering the underlying code of the application.

The present invention operates in a distributed computing environment with at least one server and clients connected to the server. A client will access a desired application located on a server. To enable the client to receive an application in a desired language, the server determines the client's language preference. Language pack software modules residing on the server contain the encoded strings of the application and their corresponding translation in a particular language. Using the appropriate language pack, the server can convert, or localize, the encoded strings in the application content to the client's preferred language. A text converter software module also residing on the server can place all data that is sensitive to regional settings in the correct format for the client's preferred language. The text converter receives all strings that are sensitive to regional settings from the ASP Engine and places them in the proper format. The text converter returns the properly formatted strings to the ASP Engine. Upon completing the localization and formatting, the server can send the application content to the client.

Existing Web applications do not permit efficient conversion of regional settings into many languages. The conventional approach involves creating a homepage in one language and then providing links from the homepage to duplicate sets of Web pages. Each duplicate set is translated into a different language with the appropriate format information for the regional settings. In contrast, the present invention requires only one set of Web pages for the specific Web application. The single application contains elements that make-up the content of the application and are encoded as strings.

DETAILED DESCRIPTION OF THE EXEMPLARY EMBODIMENTS

Figure 1:
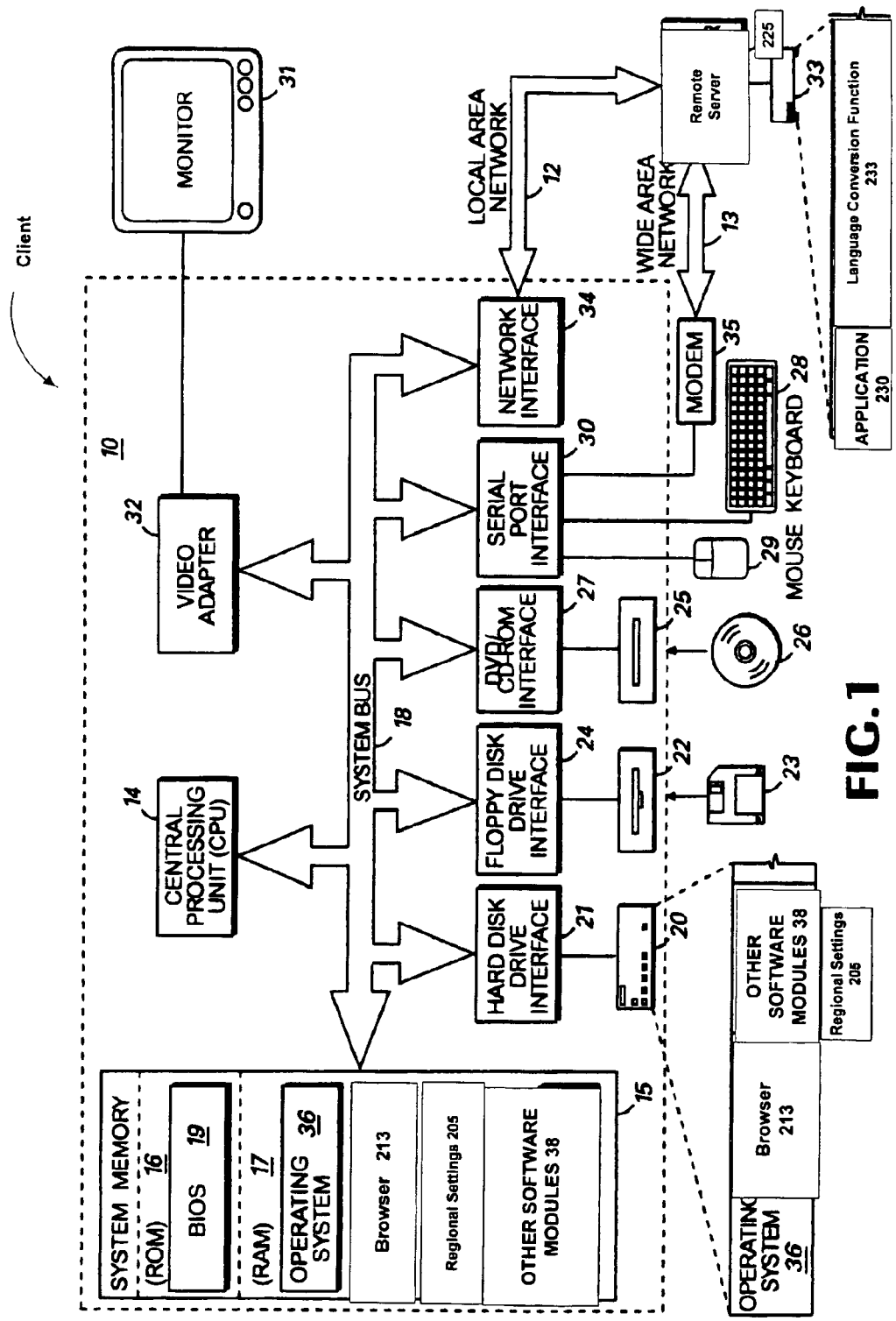
FIG. 1 is a functional block diagram illustrating the operating environment for an exemplary embodiment of the present invention.

The present invention allows for the server-based translation of content for an application into a variety of different languages with the correct regional setting format. Instead of having to create a different version of a particular application for every desired language, only one version is maintained on a server computer. Files called language packs and text converters also reside on the server. Language packs contain the data for converting the application content into a desired language. A text converter is capable of placing information such as dates and times in the correct format for the desired language. When a client accesses an application residing on a server, it can choose a language for the application content to be displayed in by the browser. At the time the application is accessed, the client also transmits its regional setting information to the server. The data contained in the language packs is used to translate the application content. The text converter takes any data sensitive to the regional settings of the language, places the sensitive data in the proper format, and converts the formatted data to a string. An ASP Engine inserts the formatted string into the translated content of the application and, in turn, the server sends the application to the client.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations in a distributed computing environment by conventional computer components, including remote file servers, remote computer servers, remote memory storage devices, a central processing unit (CPU), memory storage devices for the CPU, display devices and input devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Referring now to the drawings, in which like numerals represent like elements throughout the several figures, aspects of the present invention and the preferred operating environment will be described.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote server 225. The logical connections between the personal computer 10 and the remote server 225 are represented by a local area network 12 and a wide area network 13. Those of ordinary skill in the art will recognize that in this client/server configuration, the remote server 225 may function as a file server or computer server.

The personal computer 10 includes a CPU 14, such as "PENTIUM" microprocessors manufactured by Intel Corporation of Santa Clara, Calif. The personal computer also includes system memory 15, including read only memory (ROM) 16 and random access memory (RAM) 17, which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote server 225 in this networked environment is connected to a remote memory storage device 33. This remote memory storage device 33 is typically a large capacity device such as a hard disk drive, CD-ROM or DVD drive, magneto-optical drive or the like. Those skilled in the art will understand that program modules such as an application 230 and a language conversion function 233 are provided to the remote server 225 via computer-readable media The personal computer 10 is connected to the remote server 225 by a network interface 34, which is used to communicate over the local area network 12.

As shown in FIG. 1, the personal computer 10 is also connected to the remote server 225 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 may also be internal to the personal computer 10, thus communicating directly via the system bus 18. It is important to note that connection to the remote server 225 via both the local area network 12 and the wide area network 13 is not required, but merely illustrates alternative methods of providing a communication path between the personal computer 10 and the remote server 225.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that data such as regional settings 205 and program modules such as an operating system 36, browser 213, and other software modules 38 are provided to the personal computer 10 via computer-readable media In the preferred computer, the computer-readable media include the local or remote memory storage devices, which may include the local hard disk drive 20, floppy disk 23, CD-ROM or DVD 26, RAM 17, ROM 16, and the remote memory storage device 33. In the preferred personal computer 10, the local hard disk drive 20 is used to store data and programs, including the operating system and programs.

Figure 2:
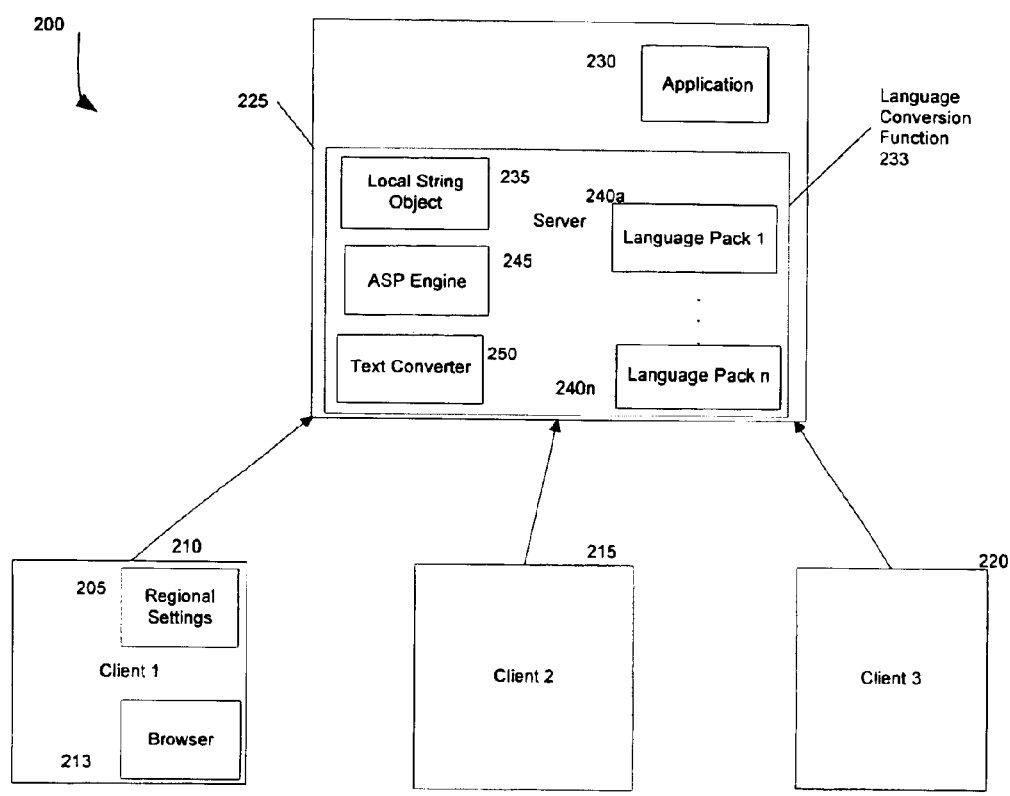
FIG. 2 is a functional block diagram illustrating the architecture of a distributed computer network in accordance with an exemplary embodiment of the present invention.

Referring now to FIG. 2, an exemplary architecture of the present invention will be described. FIG. 2 illustrates an exemplary system 200 for providing a localizable application. The system 200 includes clients 210, 215, and 220 and a server 225 and comprises a distributed computing environment. The server 225 receives digital signals from and sends digital signals to the clients 210, 215, and 220, typically via a distributed computer network, such as the Internet. A browser 213 enables client 1 210 to present digital content, based upon digital signals transmitted from the server 225. The server further comprises software modules including an application 230 and a language conversion function 233. The language conversion function 233 comprises a local string object 235, an Active Server Page Engine 245, language packs 240a through 240n, and a text converter 250.

Using the browser 213, client 1 210 can access an application 230 on the server 225. When the application is accessed, client 1 210 also transmits regional settings 205. As an example, the regional settings 205 could be collected by an Active X control residing on the client. The Active X control can collect the regional settings, encode them in a string, and the string would be transmitted when the client connects with the server. Upon receipt of the regional settings string, the server 225 adopts regional settings for client 1 210.

The local string object 235 determines the language the application 230 will be converted into based upon a client language preference. A language pack 240a is selected that matches the language selected by the local string object 235. The language pack 240a provides a translation for the content of the application 230. The Active Server Page Engine 245 calls the text converter 250 with any application data that is sensitive to regional settings. The local string object 235 sends the sensitive data to the text converter 250 where it is properly formatted and converted to a string. The local string object 235 returns the formatted strings to the ASP Engine 245 and the server 225 sends translated content for the application 230 to the client 210.

Figure 3:
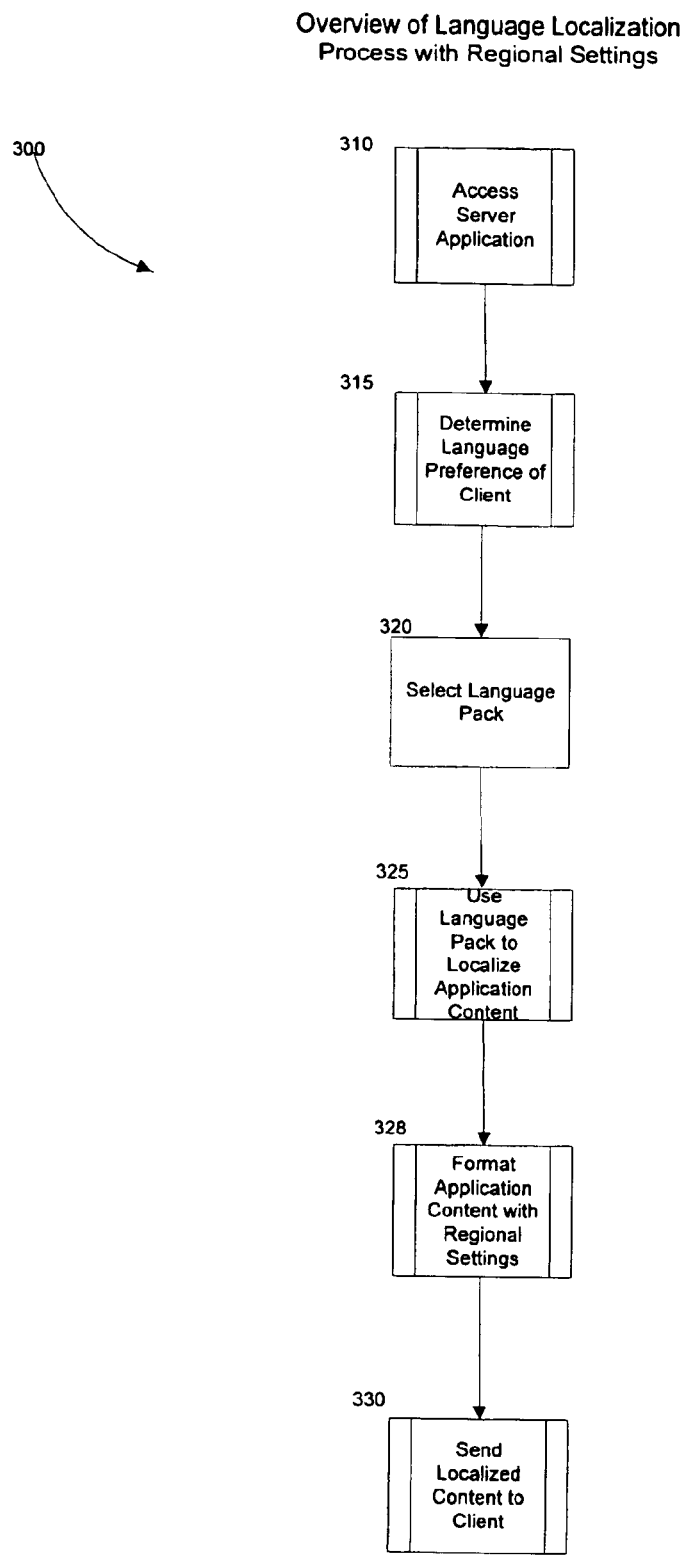
FIG. 3 is a logic flow diagram illustrating an overview of an exemplary process for converting a Web application into a language selected by a client with the appropriate regional settings.

FIG. 3 is a logic flow diagram illustrating an overview of exemplary steps for a language localization process with regional settings. Referring now to FIGS. 2 and 3, a process 300 begins at step 310, with client 1 210 accessing an application 230 on a server 225. The regional setting information for client 1 210 is transmitted to the server 225 at the time the application 230 is accessed. In step 315, the local string object 235 determines the client's language preference at the server 225. Once the client's language preference is determined in step 320, the local string object 235 selects the language pack 240a that supports the preferred language. In step 325, the selected language pack 240a supplies all of the localizable elements in the application 230. Formatting of any data in the application 230 sensitive to regional settings is accomplished in step 328. Finally, in step 330, the server 225 sends the localized and properly formatted application to the client 1 210.

Figure 4:
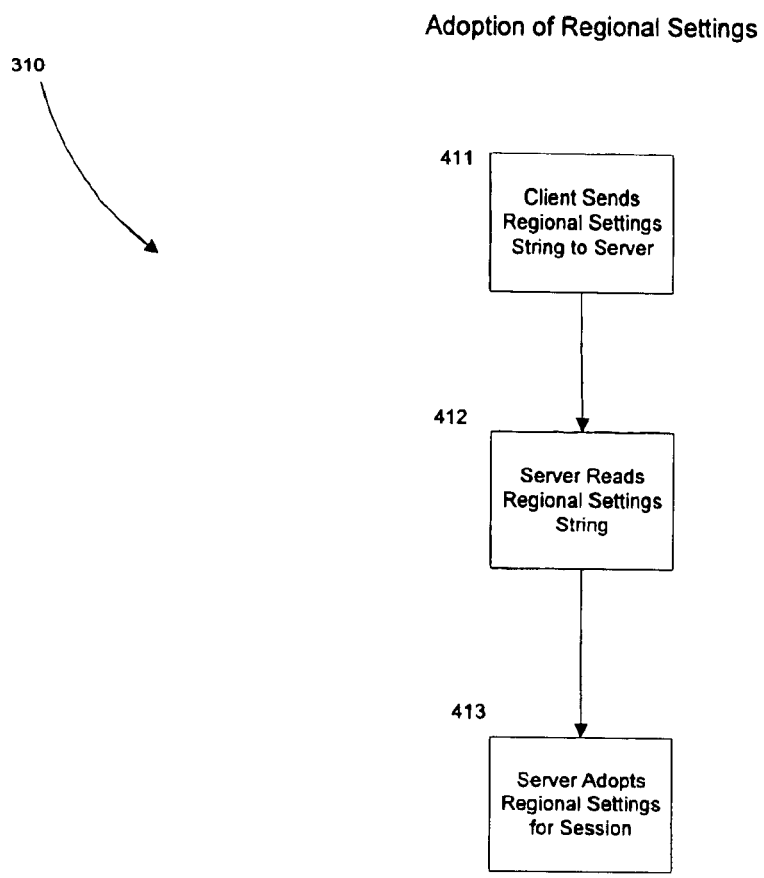
FIG. 4 is a logic flow diagram illustrating an exemplary process for a server to adopt a client's regional settings.

FIG. 4 is a logic flow diagram illustrating an exemplary process for the server to adopt the regional settings of client 1 210 as represented in step 310. In step 411, the regional settings are sent from client 1 210 to the server 225. As an example, the regional settings could be packaged as a string and placed in a hidden form field. This string would accompany the initial request from the client 1 210 for the application 230. In step 412, the server 225 reads the regional settings information. The server 225 adopts the regional settings corresponding to the client 1 210 in step 413. The regional settings will control the format of data for the session that the client 1 210 maintains with the server 225.

Figure 5:
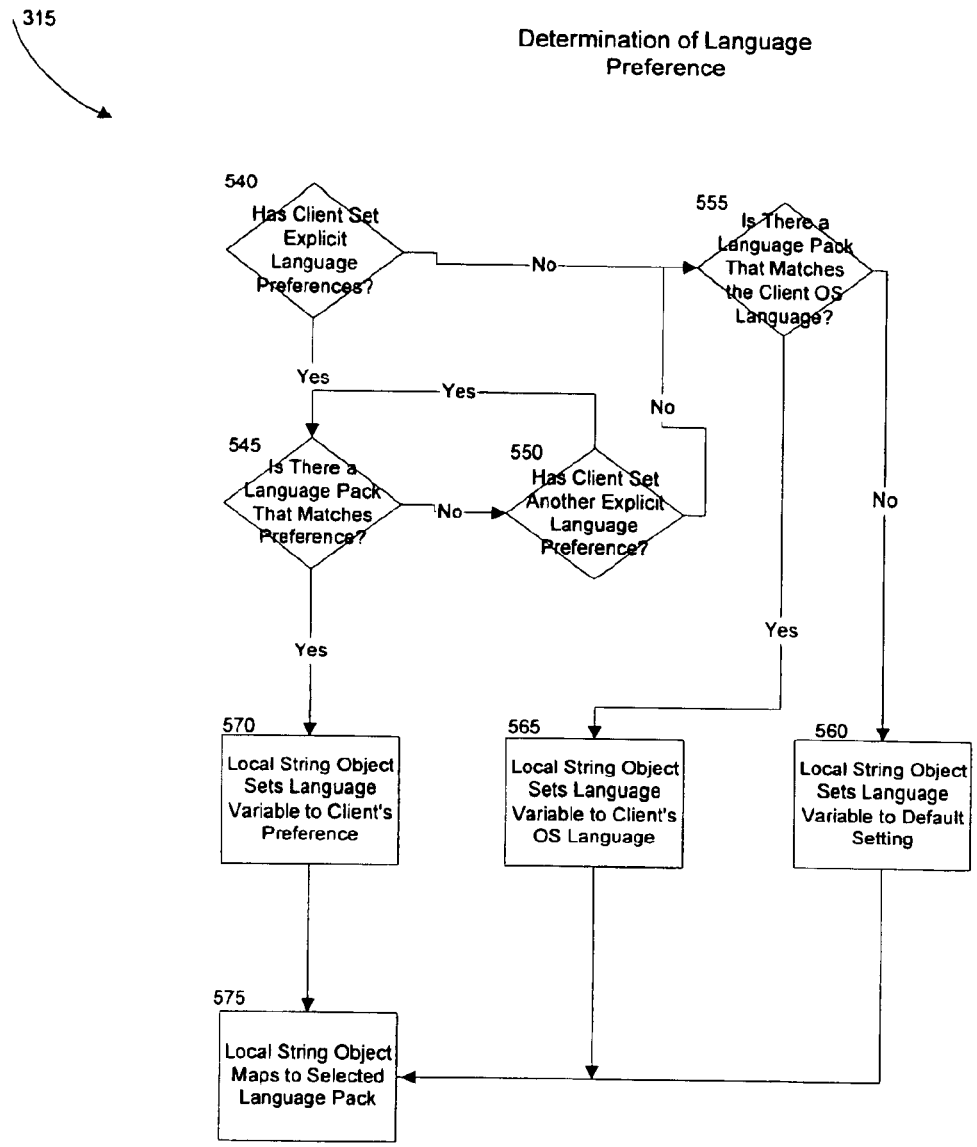
FIG. 5 is a logic flow diagram illustrating an exemplary process for determining a client's language preference.

FIG. 5 is a logic flow diagram illustrating in more detail the exemplary steps of task 315 for determining a client's language preference. Beginning with step 540, the local string object 235 looks to the browser 213 to determine whether the client 210 has set an explicit language preference. If client 1 210 has set explicit language preferences, they will be contained, in order of preference, in a signal that the browser 213 sends to the server 225 at the time of the initial access. If client 1 210 has not set an explicit language preference, the "No" branch is followed to step 555. If client 1 210 has set an explicit language preference, the "Yes" branch is followed to step 545. The local string object determines in step 445 whether there is a language pack that supports client 1's explicit language preference.

If there is a supporting language pack, the "Yes" branch is followed from step 545 to step 570. The local string object 235 in step 570 sets a language variable to the client's language preference. If in step 545 there is no matching language pack, the "No" branch is followed to step 550 where the local string object 235 determines whether the browser 213 has transmitted other explicit language preferences for client 1 210. If client 1 210 has made other explicit language preferences, the "Yes" branch is followed back to step 545 and this loop continues until either an explicit language preference is matched to a language pack or client 1's preferences are exhausted. When the explicit language preferences are exhausted in step 550, the "No" branch is followed to step 555.

If step 555 is reached, client 1 210 does not have explicit language preferences and, consequently, the browser 213 transmits the operating system language of the client 1 210 to the server 225. The local string object 235 determines whether there is a language pack that matches the client 1 operating system language. If there is a language pack matching the operating system language, the "Yes" branch is followed to step 565 and the language variable is set to correspond with the client 1 operating system language. If there is no language pack that matches the client 1 operating system language, the "No" branch is followed to step 560 and the local string object 235 sets the language variable to a default setting predetermined by the server.

In step 575 the local string object 235 looks at a list of the language packs on the server and selects the language pack 240a corresponding to the language variable. This language pack 240a will be used to convert, or localize, the string elements in the application into a particular language. Each language pack on the server contains the string conversions for a language.

Figure 6:
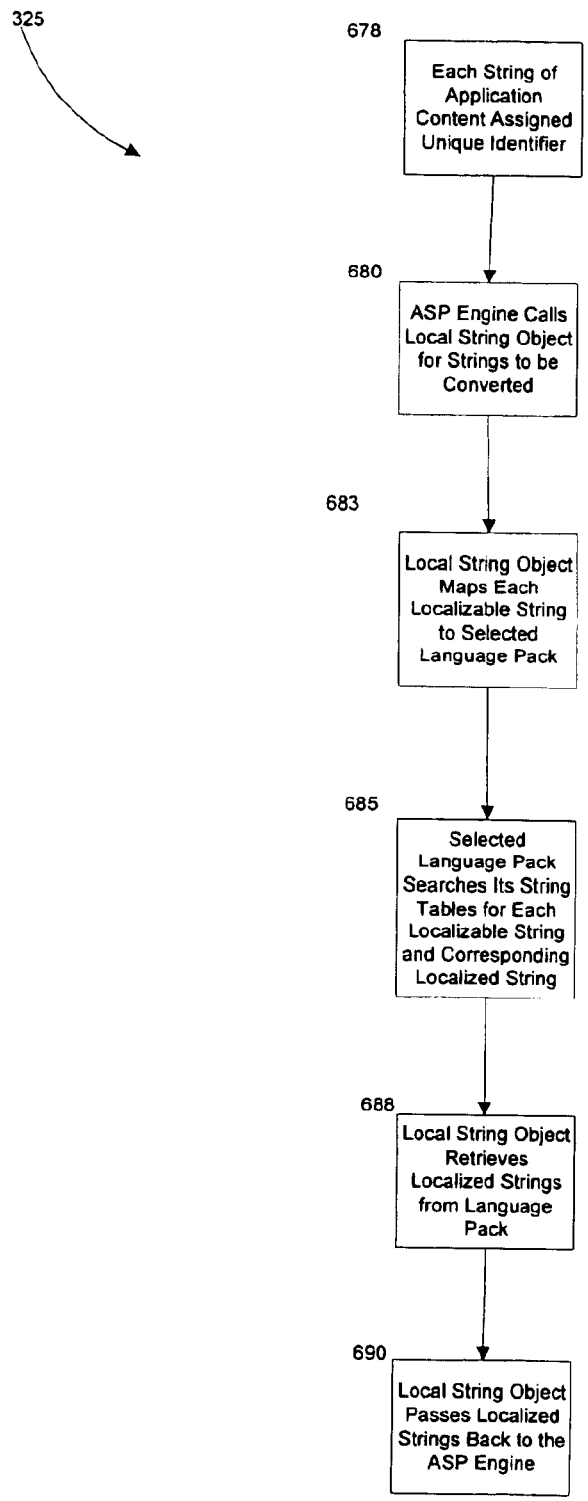
FIG. 6 is a logic flow diagram illustrating an exemplary process for localizing a Web application with a language pack.

FIG. 6 sets forth in greater detail the process represented by task 325. Referring to FIG. 6, in step 678, each string of content in the application 230 is assigned a unique identifier. The unique identifier is used to locate the string in a table located within the language pack. In step 680, the ASP Engine 245, which renders the application content, calls the local string object for the localizable strings of content to be mapped. In response, the local string object maps the localizable strings of content in step 683 to the selected language pack 240a. Essentially, the mapping process is a search in the language pack for the string elements that make-up the application and their corresponding words or symbols in a specific language. In step 685, the language pack 240a searches its string tables for the unique identifier of each localizable string and the corresponding localized string. Once a string is located, it is converted into the localized string which is in the desired language. This process is completed for all the encoded strings of content in the application. The local string object 235 retrieves the localized strings from the language pack 240a in step 688. In step 690, the local string object 235 passes the localized strings back to the ASP Engine 245.

Figure 7:
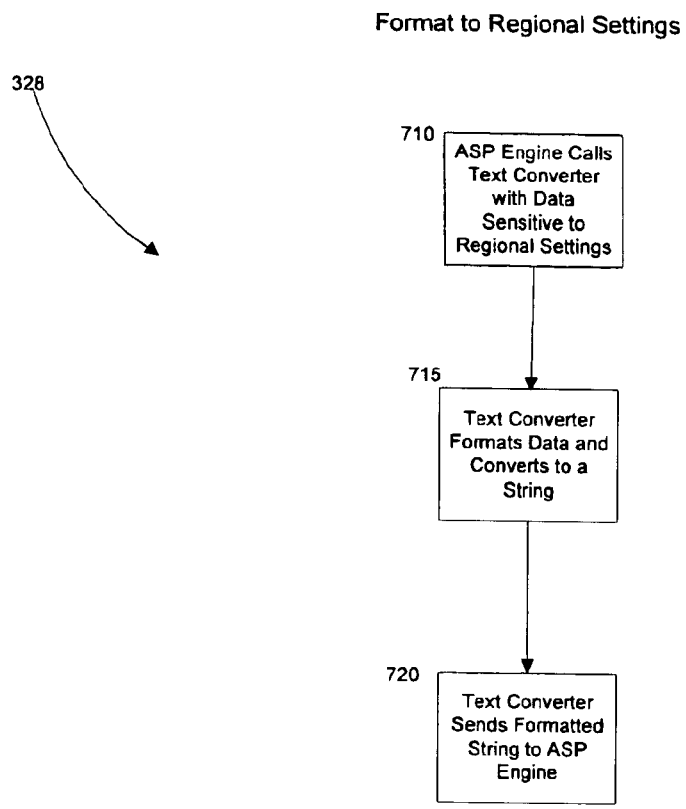
FIG. 7 is a logic flow diagram illustrating an exemplary process for formatting regional settings.

FIG. 7 is a logic flow diagram illustrating an exemplary process for formatting data to regional settings as represented in step 328. In step 710 the ASP Engine 245 calls the text converter 250 with data that is sensitive to regional settings. For example, this data could be dates, times, counting numbers, or currency values. The order in which the day, month, and year are set forth in a date varies among languages. Commas and decimal points are also used in different ways in setting out numbers for counting or for currency values. In step 715 the text converter 250 puts the data in the desired format utilizing the regional settings adopted from client 1 210 at the time the server was accessed. Once in the desired format, the data is also converted to a string. Finally, in step 720, the formatted string is returned to the ASP Engine 245. The formatted string will be inserted into the HTML with the other strings retrieved from the selected language pack 240a.

Figure 8:
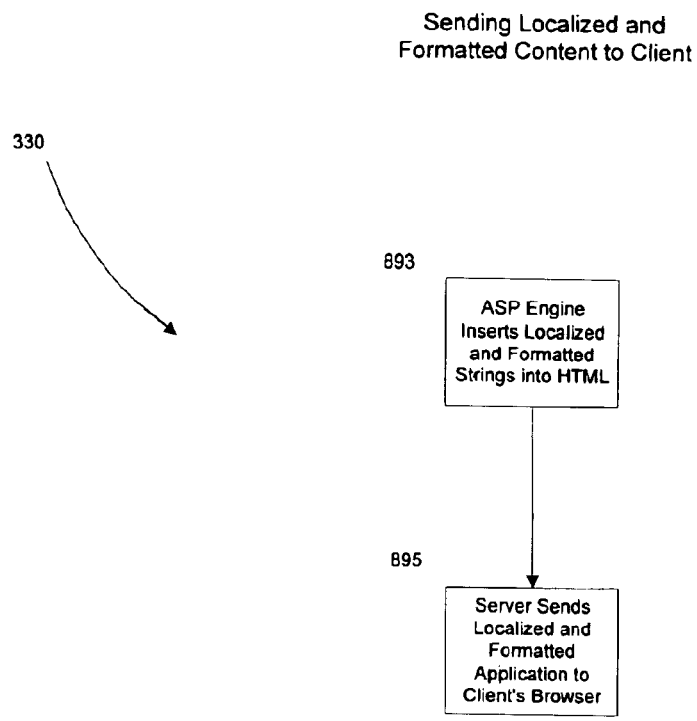
FIG. 8 is a logic flow diagram illustrating an exemplary process for sending a localized and formatted application to a client.

The steps represented in task 330 are set out in greater detail in FIG. 8. FIG. 8 illustrates the last phase of the process, actually transmitting the application to client 1 210 in the desired language and with the proper regional settings. In step 893, the ASP Engine 245 renders the application in the selected language. This is typically accomplished by inserting the localized strings from the language pack 240a and the formatted strings from the text converter 250 into HTML. Finally, the server 225 sends the localized and formatted application to the client's browser 213 as HTML content in step 895.

Client 1 210 now has the application 230 in a language it can understand with the proper regional settings. At the same time, another client 215 may retrieve the application 230 in a different language and with different regional settings. A language pack 240n for the client 215 selected language translates the application 230. The text converter 250 again formats any data sensitive to the regional settings of the newly selected language. Once the application is translated and formatted, it is sent to the client 215. Only one version of the application 230 exists on the server 225 to facilitate any changes that need to be made.

Those skilled in the art will appreciate that the invention has a wide range of applications beyond the environment of the World Wide Web. This method of language localization could be utilized in other types of distributed computing networks where there is a need to express content in varying languages. This method can also be used in a situation where the application resides on a personal computer and localization occurs either on the personal computer or on another computer that is logically connected.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof.

What is claimed is:

1. A method for providing an application in a desired language with correct regional settings from a server, comprising the steps of:

receiving from a client a request to access the application;

determining a language preference for the client;

selecting a language pack based on the determined language preference;

converting content of the application to the determined preferred language using the selected language pack;

dynamically formatting the content of the application with regional settings corresponding to the client's language preference by using a text converter; and transmitting the converted content of the application to the client.

2. The method of claim 1, wherein the step of receiving from a client a request to access an application on a server comprises the steps of:

receiving a regional settings string sent from the client;

reading the regional settings string at the text converter; and adopting regional setting for the client at the text converter.

3. The method of claim 1, wherein the step of dynamically formatting the content of the application with regional settings corresponding to the client's language preference comprises the steps of:

calling the text converter with data that is sensitive to regional settings;

formatting the sensitive data to the regional settings corresponding to the client's language preference and converting the data to a string; and returning the formatted string to an Active Server Page Engine.

4. A computer system capable of receiving an application access request and a regional settings string, wherein the computer system can provide application content in a variety of languages with correct regional settings, comprising:

a local string software module operable for determining a client's language preference;

a plurality of language pack software modules, each corresponding to a language and operable to convert the content of the application into a different language; and a text converter operable for receiving data sensitive to regional settings and dynamically converting the sensitive data to a format corresponding with the client's language preference.

5. The system of claim 4, wherein the computer system is further operable for:

receiving the regional settings string;

reading the regional settings string at the text converter; and adopting the regional settings at the text converter.

6. The system of claim 4, wherein the text converter software module is further operable for:

receiving a call from an ASP Engine software module with data that is sensitive to regional settings;

formatting the sensitive data;

converting the formatted data into a string; and returning the formatted string to an Active Server Page Engine.

7. A computer-readable medium having computer-executable instructions for causing a computer system to perform a method for receiving an application in a desired language with correct regional settings from a server, the method comprising:

sending to the server a request to access the application, the request including an indication of a regional setting; and receiving from the server the requested application, the application having been dynamically formatted at the server by a text converter component based on the indicated regional setting.

8. The computer-readable medium of claim 7 wherein the application contains data that is sensitive to regional settings.

9. The computer-readable medium of claim 8 wherein the server formats the data that is sensitive to regional settings when the server dynamically formats the application.

10. The computer-readable medium of claim 7 wherein the server has a language pack corresponding to the desired language.

11. The computer-readable medium of claim 7 wherein the server dynamically converts the application using an Active Server Page engine.

12. A computer-readable medium having computer-executable instructions for causing a computer system to perform a method for providing an application in a desired language with correct regional settings from a server, the method comprising:

receiving from a client a request to access the application;

determining a language preference for the client;

selecting a language pack based on the determined language preference;

converting content of the application to the determined preferred language using the selected language pack;

dynamically formatting the content of the application with regional settings corresponding to the client's language preference by using a text converter; and transmitting the converted content of the application to the client.

13. The computer-readable medium of claim 12, wherein the receiving from a client a request to access an application on a server comprises:

receiving a regional settings string sent from the client;

reading the regional settings string at the text converter; and adopting regional settings for the client at the text converter.

14. The computer-readable medium of claim 12, wherein the dynamically formatting the content of the application with regional settings corresponding to the client's language preference comprises:

calling the text converter with data that is sensitive to regional settings;

formatting the sensitive data to the regional settings corresponding to the client's language preference and converting the data to a string; and returning the formatted string to an Active Server Page engine.

15. The computer-readable medium of claim 12, wherein the converting is performed dynamically upon receiving the request from the client.

16. The computer-readable medium of claim 12, wherein converted and formatted content is not stored for access by other clients after it is provided to the client that sent the request.

17. The computer-readable medium of claim 12, wherein the dynamically converted content is a date.

18. The computer-readable medium of claim 12, wherein the dynamically converted content is a time.

19. The computer-readable medium of claim 12, wherein the dynamically converted content is a currency.

20. The computer-readable medium of claim 12, wherein the formatted content is transmitted using a markup language.

* * * * *